United States Patent
Lee

(10) Patent No.: US 12,272,502 B2
(45) Date of Patent: Apr. 8, 2025

(54) POWER REDUCTION DEVICE BASED ON DIELECTRIC COMPOSITE

(71) Applicant: KESECO CO., LTD, Goyang-si (KR)

(72) Inventor: Dong Myung Lee, Goyang-si (KR)

(73) Assignee: KESECO CO., LTD, Goyang-si (KR)

( * ) Notice: Subject to any disclaimer, the term of this patent is extended or adjusted under 35 U.S.C. 154(b) by 200 days.

(21) Appl. No.: 17/800,020

(22) PCT Filed: Mar. 24, 2021

(86) PCT No.: PCT/KR2021/003653
§ 371 (c)(1),
(2) Date: Aug. 16, 2022

(87) PCT Pub. No.: WO2021/194258
PCT Pub. Date: Sep. 30, 2021

(65) Prior Publication Data
US 2023/0076805 A1    Mar. 9, 2023

(30) Foreign Application Priority Data
Mar. 24, 2020    (KR) .......... 10-2020-0035818

(51) Int. Cl.
*H01G 4/40*    (2006.01)
*H01F 27/40*    (2006.01)
(Continued)

(52) U.S. Cl.
CPC .............. *H01G 4/40* (2013.01); *H01F 27/40* (2013.01); *H01G 4/005* (2013.01); *H01G 4/08* (2013.01)

(58) Field of Classification Search
CPC ........... H01G 4/40; H01G 4/005; H01G 4/08; H01G 4/224; H01F 27/40; H01F 17/00; H02J 3/18
(Continued)

(56) References Cited

U.S. PATENT DOCUMENTS

2010/0103586 A1* 4/2010 Tang .............. H01G 4/232
361/301.4
2014/0312990 A1* 10/2014 Lee .............. H03H 1/0007
333/181
(Continued)

FOREIGN PATENT DOCUMENTS

CN    105308828 A    2/2016
KR    10-2012-0115697 A    10/2012
(Continued)

OTHER PUBLICATIONS

Löhnert, R., Bartsch, H., Schmidt, R., Capraro, B. and Töpfer, J. (2015), Microstructure and Electric Properties of CaCu3Ti4O12 Multilayer Capacitors. J. Am. Ceram. Soc., 98: 141-147. https://doi.org/10.1111/jace.13260 (Year: 2015).*

*Primary Examiner* — Thienvu V Tran
*Assistant Examiner* — Sreeya Sreevatsa
(74) *Attorney, Agent, or Firm* — NSIP Law

(57) ABSTRACT

The present disclosure relates to a dielectric composite-based power reduction device. The power reduction device of the present disclosure is a dielectric composite-based power reduction device capable of high-efficiency power reduction via parallel connection to an input power supply. The power reduction is achieved by reactive power reduction based on a capacitor bank principle, a harmonic wave reduction by inductance, and an increase in active power efficiency. Disclosed are a composite electrode structure capable of achieving all of those, and an improvement in a performance based on a development of the composite.

15 Claims, 9 Drawing Sheets

(51) Int. Cl.
*H01G 4/005* (2006.01)
*H01G 4/08* (2006.01)

(58) Field of Classification Search
USPC .......................................................... 361/270
See application file for complete search history.

(56) References Cited

U.S. PATENT DOCUMENTS

| | | | |
|---|---|---|---|
| 2016/0020041 A1* | 1/2016 | Ahn | H01G 2/106 |
| | | | 361/767 |
| 2016/0072336 A1 | 3/2016 | Tamino et al. | |
| 2016/0189868 A1* | 6/2016 | Sasaki | H01G 4/012 |
| | | | 361/301.4 |
| 2016/0284471 A1* | 9/2016 | Mizuno | H01G 4/1227 |
| 2017/0169954 A1* | 6/2017 | Ota | H01G 4/232 |

FOREIGN PATENT DOCUMENTS

| | | |
|---|---|---|
| KR | 10-1264106 B1 | 5/2013 |
| KR | 10-1551872 B1 | 9/2015 |
| KR | 10-2056776 B1 | 12/2019 |
| KR | 10-2091468 B1 | 3/2020 |
| KR | 10-2171490 B1 | 10/2020 |
| WO | WO 2014/208683 A1 | 12/2014 |

\* cited by examiner

• FILLER SHAPE

1) LAYER BY LAYER  2) PARTICLE  3) ROD

○ FILLER ● DIELECTRIC MATRIX

• FILLER CHARACTERISTICS

1) HIGH DIELECTRIC CONSTANT  2) HIGH MAGNETIC CONSTANT  3) MULTIFUNCTIONAL

● CARBON-BASED CONDUCTIVE MATERIAL, METALLIC MATERIAL, HIGH-DIELECTRIC CERAMIC MATERIAL, AND THE LIKE

○ MAGNETIC MATERIALS SUCH AS $Fe_3O_4$, NI, AND THE LIKE

POWER REDUCTION DEVICE BASED ON DIELECTRIC COMPOSITE

CROSS REFERENCE TO RELATED APPLICATIONS

This application is a U.S. National Stage Application of International Application No. PCT/KR2021/003653, filed on Mar. 24, 2021, which claims the benefit under 35 USC 119 (a) and 365(b) of Korean Patent Application No. 10-2020-0035818, filed on Mar. 24, 2020, in the Korean Intellectual Property Office, the entire disclosure of which is incorporated herein by reference for all purposes.

FIELD

The present disclosure relates to a dielectric composite-based power reduction device. The power reduction device of the present disclosure is a dielectric composite-based power reduction device capable of high-efficiency power reduction via parallel connection to an input power supply.

DESCRIPTION OF RELATED ART

An existing power reduction technology has been developed to reduce power consumption of an electronic device (all devices that consume power, such as a motor, a circuit, and the like) via power quality improvement.

Causes of excessive power consumption due to poor power efficiency include an increase in reactive power and generation of a harmonic wave caused by a non-linear load included in most modern electronic devices.

The reactive power means power that is not actually consumed of total input power. The reactive power is increased by generating a power phase error caused by the non-linear load. In addition, the non-linear load causes distortion of the input power to generate the harmonic wave. The harmonic wave has a high frequency corresponding to an odd multiple of a frequency of commercial power and reduces a power efficiency of active power by causing operational disturbances, heat, noise, and the like of the electronic device.

For reduction of the reactive power, there has been a scheme of connecting a circuit configuration including a variable capacitor and a phase error detection sensor to compensate for deterioration of the power quality or of connect an inductor to suppress the generation of the harmonic wave.

However, because the circuit configuration and the reduction device must be connected independently, effectiveness decreases, a cost increases, and standby power is required. In addition, for high power reduction of the active power and the reactive power, a new material with high capacitance and inductance is needed. Although a development and an application of an optimal material are insufficient.

PRIOR ART LITERATURE

Patent Literature (Patent Literature 1) Patent No. 10-1551872 (2015 Sep. 9.)
(Patent Literature 2) Patent No. 10-2056776 (2019 Dec. 17.)

DISCLOSURE

Technical Purpose

The present disclosure is to develop a device capable of high-efficiency power reduction based on a composite electrode structure having both capacitance and inductance at the same time and a dielectric composite that has a high dielectric constant and a high magnetic constant and maximizes each characteristic.

Technical Solution

A power reducing device based on a dielectric composite according to an embodiment of the present disclosure is disposed between and connected in parallel with an input power supply and an electronic device, the power reducing device includes electrode members embedded in a dielectric composite in a casing, the electrode members include two or three pairs of electrode members, each of the two or three pairs of electrode members is composed of two electrodes facing each other, and one electrode of the two electrodes of each of the two or three pairs of electrode members has a rectangular planar shape, while the other electrode thereof has a planar pattern of a "ㄷ" or "ㄹ" shape or a repetitive arrangement of planar patterns of a "ㄷ" or "ㄹ" shape.

The dielectric composite contains a filler for increasing a dielectric constant or a filler for increasing a magnetic constant.

The filler for increasing the dielectric constant includes at least one of a reduced graphene oxide, a carbon nanotube, a graphene, a conductive metal, CCTO, $TiO_2$, and $Al_2O_3$.

The filler for increasing the magnetic constant includes $Fe_2O_3$ or Ni.

The filler is present in a form of particles, layers, or rods.

A power reducing device based on a dielectric composite according to an additional embodiment of the present disclosure is disposed between and connected in parallel with an input power supply and an electronic device, the power reducing device includes electrode members embedded in a dielectric composite in a casing, the electrode members include two or three pairs of electrode members, each of the two or three pairs of electrode members is composed of two electrodes facing each other, one electrode of the two electrodes of one of the two or three pairs of electrode members has a rectangular planar shape, while the other electrode thereof has a planar pattern of a "ㄷ" or "ㄹ" shape or a repetitive arrangement of planar patterns of a "ㄷ" or "ㄹ" shape, and each of the two electrodes of a remaining pair or each of remaining pairs of the two or three pairs of electrode members has a rectangular planar shape.

The dielectric composite contains a filler for increasing a dielectric constant or a filler for increasing a magnetic constant.

The filler for increasing the dielectric constant includes at least one of: a carbon-based conductive material including a reduced graphene oxide, a carbon nanotube, and a graphene; a conductive metal; or a ceramic material with a high dielectric constant including CCTO, $TiO_2$, and $Al_2O_3$.

The filler for increasing the magnetic constant includes a material with magnetic properties including $Fe_2O_3$ or Ni.

The filler is present in a form of particles, layers, or rods.

A power reducing device based on a dielectric composite according to an additional embodiment of the present disclosure is disposed between and connected in parallel with an input power supply and an electronic device, the power reducing device includes electrode members embedded in a dielectric composite in a casing, the electrode members include two or three pairs of electrode members, each of the two or three pairs of electrode members is composed of two electrodes facing each other, one electrode of the two electrodes of one of the two or three pairs of electrode members has a rectangular planar shape, while the other electrode thereof has a planar pattern of a "ㄷ" or "ㄹ" shape or a repetitive arrangement of planar patterns of a "ㄷ" or "ㄹ" shape, and each of the two electrodes of a remaining pair or each of remaining pairs of the two or three pairs of electrode members has a planar pattern of a "ㄷ" or "ㄹ" shape or a repetitive arrangement of planar patterns of a "ㄷ" or "ㄹ" shape.

The dielectric composite contains a filler for increasing a dielectric constant or a filler for increasing a magnetic constant.

The filler for increasing the dielectric constant includes at least one of: a carbon-based conductive material including a reduced graphene oxide, a carbon nanotube, and a graphene; a conductive metal; or a ceramic material with a high dielectric constant including CCTO, $TiO_2$, and $Al_2O_3$.

The filler for increasing the magnetic constant includes a material with magnetic properties such as $Fe_2O_3$ or Ni.

The filler is present in a form of particles, layers, or rods.

Technical Effects

According to the present disclosure, the simple connection of the power reduction device may achieve the high-efficiency power reduction, and may further be expected to be utilized as a countermeasure against an energy crisis.

Figure 1A:
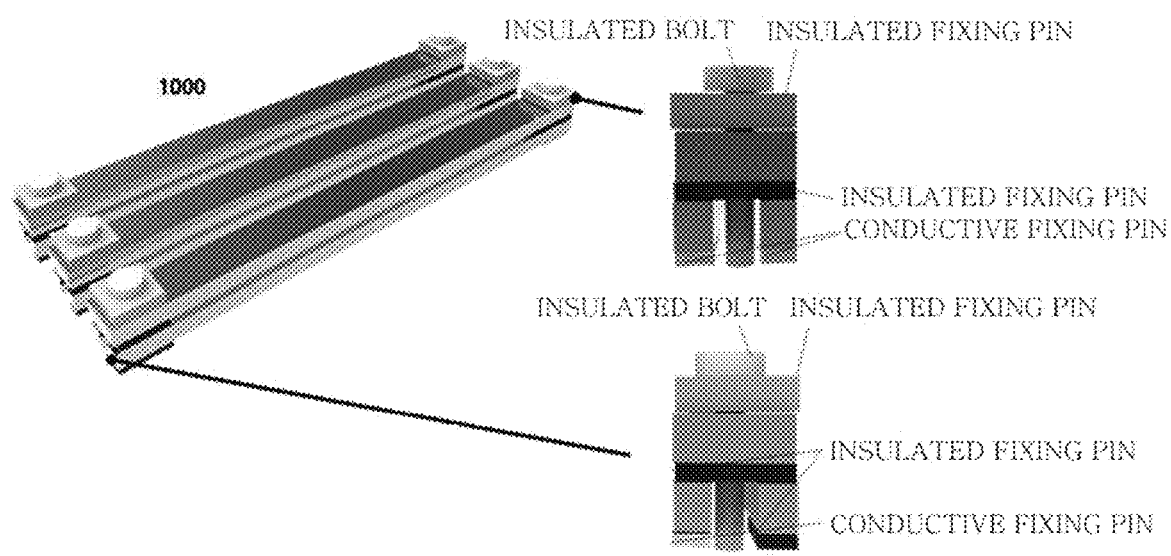
FIG. 1A and FIG. 1B show schematic diagrams of a dielectric composite-based power reduction device according to one embodiment of the present disclosure, respectively.

Various embodiments are now described with reference to the drawings, and like reference numerals are used to indicate like elements throughout the drawings. Herein, for a purpose of illustration, various descriptions are presented to provide an understanding of the present disclosure. However, it is clear that such embodiments may be practiced without such specific descriptions. In other examples, well-known structures and devices are presented in a block diagram form to facilitate the description of the embodiments.

DETAILED DESCRIPTIONS

Hereinafter, an embodiment of the present disclosure will be described in detail with reference to the accompanying drawings. In the present disclosure, various changes may be made. The present disclosure may have various forms. Thus, specific embodiments may be illustrated in the drawings and may be described in detail herein. However, the embodiments are not intended to limit the present disclosure to a specific form. It should be understood that the present disclosure may include all changes, equivalents or substitutes included in the spirit and scope of the present disclosure. In illustrating the drawings, like reference numerals have been used for like elements.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

In order to achieve the purpose of the present disclosure, it is to present a power reduction principle by designing a power reduction device with a composite electrode structure embedded in a dielectric composite and establishing a circuit model.

The present disclosure is to develop a device capable of high-efficiency power reduction with simple installation via a development of a composite electrode structure having both capacitance and inductance characteristics at the same time and a dielectric composite that strengthens the characteristics.

Figure 1B:
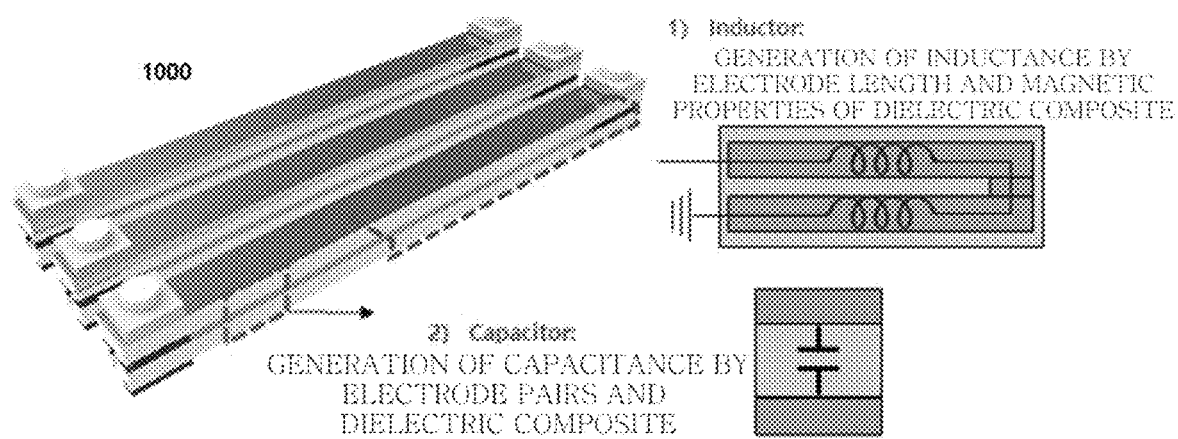

FIG. 1A and FIG. 1B show schematic diagrams of a dielectric composite-based power reduction device according to one embodiment of the present disclosure, respectively.

A dielectric composite-based power reduction device 1000 according to one embodiment of the present disclosure is disposed between and connected in parallel with an input power supply and an electronic device, and includes electrode members 200 embedded in a dielectric composite 300 in a casing 100.

Figure 5:
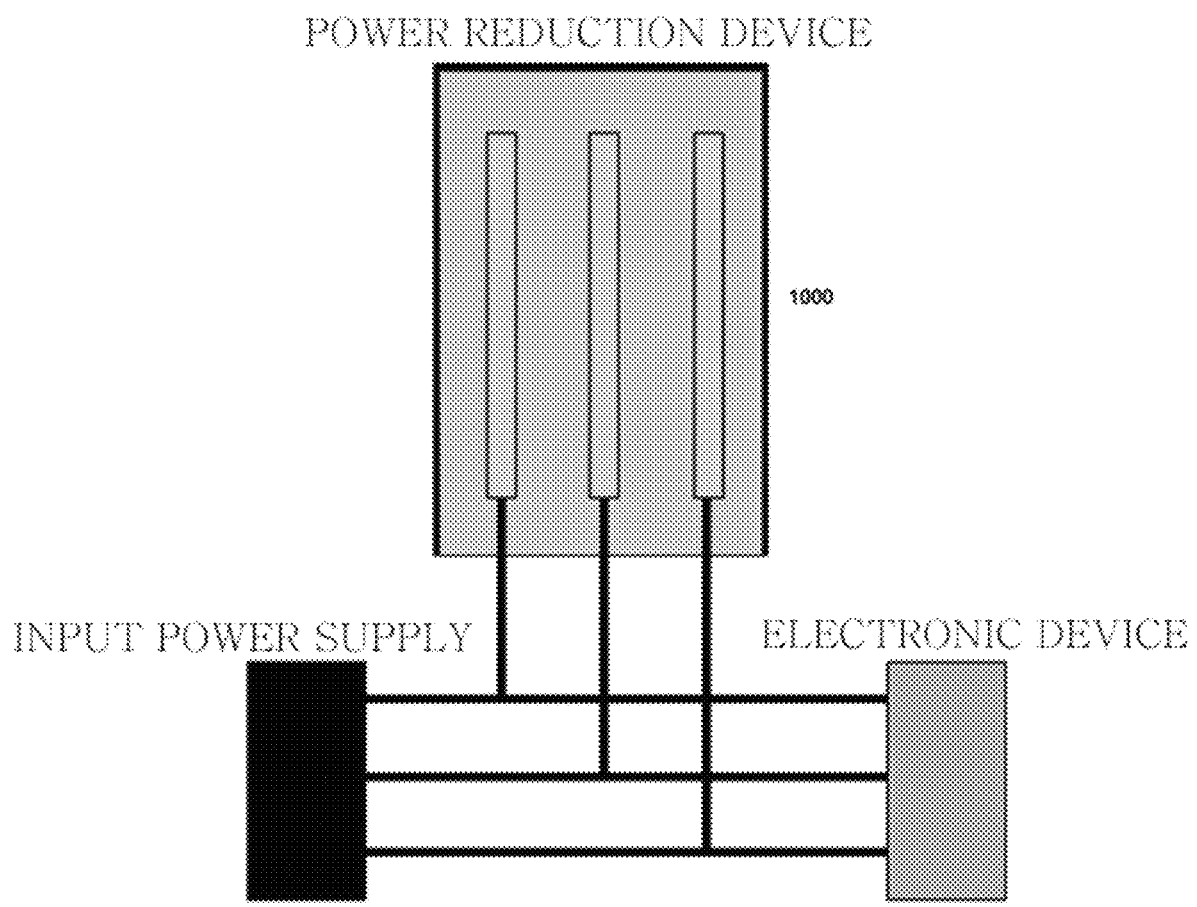
FIG. 5 is a schematic view of a dielectric composite-based power reduction device according to one embodiment of the present disclosure disposed between and connected in parallel with an input power supply and an electronic device.

The dielectric composite-based power reduction device 1000 according to one embodiment of the present disclosure is connected in parallel with the input power supply and the electronic device. FIG. 5 is a schematic view of a dielectric composite-based power reduction device according to one embodiment of the present disclosure disposed between and connected in parallel with an input power supply and an electronic device.

Figure 2:
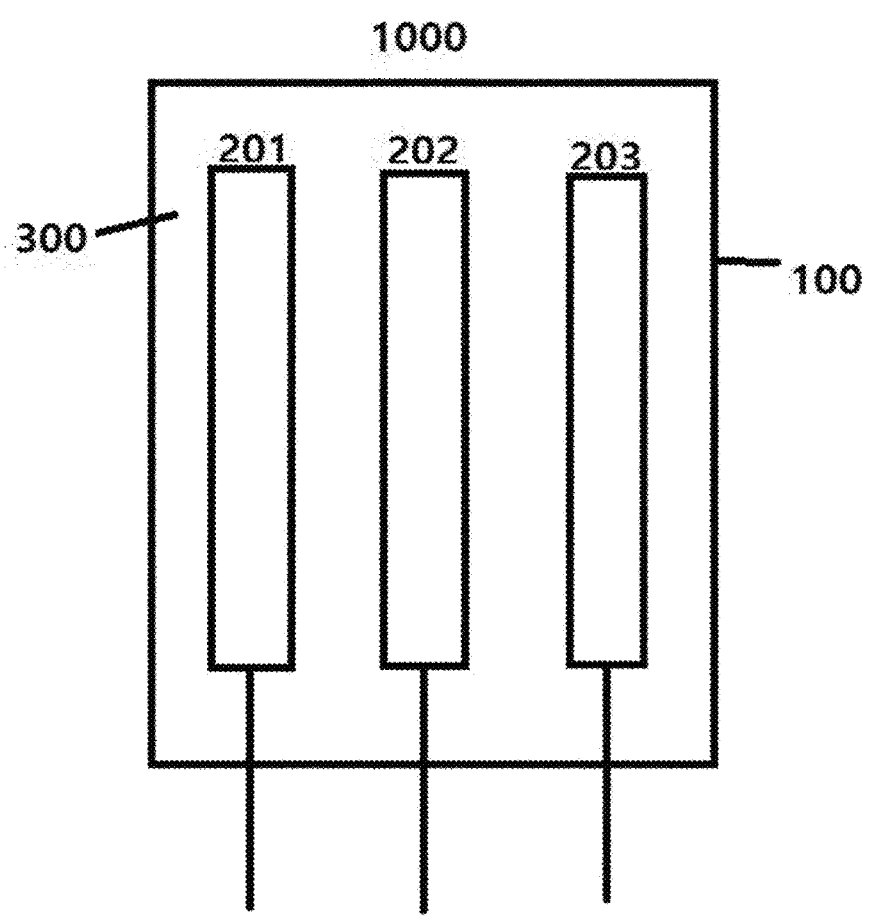
FIG. 2 shows a plan view of a dielectric composite-based power reduction device according to one embodiment of the present disclosure.
Figure 3:
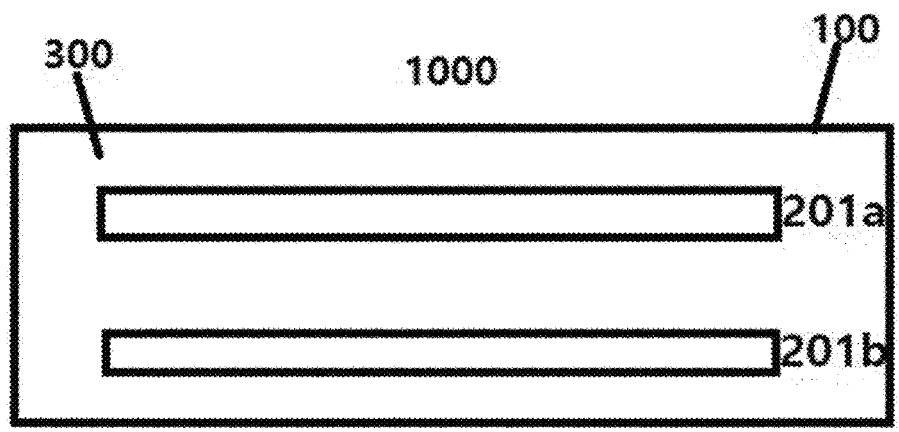
FIG. 3 shows a side cross-sectional view of a dielectric composite-based power reduction device according to one embodiment of the present disclosure.

FIG. 2 shows a plan view of a dielectric composite-based power reduction device according to one embodiment of the present disclosure, and FIG. 3 shows a side cross-sectional view of a dielectric composite-based power reduction device according to one embodiment of the present disclosure.

The dielectric composite-based power reduction device 1000 according to one embodiment of the present disclosure includes the dielectric composite 300 inside the casing 100.

The casing 100 is a casing for protecting the dielectric composite 300 and the electrode members 200, and there is no particular limitation thereto.

Each pair of the electrode members 200 corresponds to each power phase, and a form in which the casing 100, the dielectric composite 300, and the electrode members 200 are connected to each other includes a form in which the components are connected to each other by being divided for each power phase or a form in which a ground wire is added.

The dielectric composite 300 may contain a filler that increases a dielectric constant or a magnetic constant.

The dielectric composite may vary in composition and ratio to achieve a great dielectric constant or a great magnetic constant, and the present disclosure may include combinations to achieve one or both of those. A matrix of the dielectric composite is based on tourmaline, and materials with dielectric properties such as a polymer and a ceramic are able to be used depending on a purpose and a use.

The filler that increases the dielectric constant includes at least one of a reduced graphene oxide, a carbon nanotube, a graphene, a conductive metal, a calcium copper titanium oxide (CCTO), $TiO_2$, and $Al_2O_3$, and the filler that increases the magnetic constant includes $Fe_2O_3$ or Ni.

The filler of the dielectric composite is a material that is added and compounded to the dielectric matrix to increase the dielectric constant or increase the magnetic constant. As a material that increases the dielectric constant, a carbon-based conductive filler (including the reduced graphene oxide, the carbon nanotube, the graphene, and a chemically modified material), a metal material (a metal with conductivity, such as Zn, Ni, Fe), or a high-dielectric ceramic material with a high dielectric constant (CCTO, $TiO_2$, $Al_2O_3$, and the like) are available, all materials that increase the dielectric constant are included.

Figure 8:
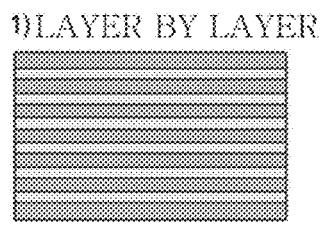
FIG. 8 shows application examples based on shapes and characteristics of a filler.
Figure 8:
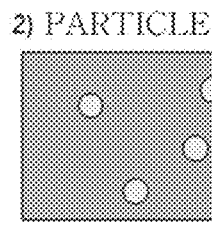
Figure 8:
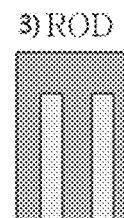
Figure 8:
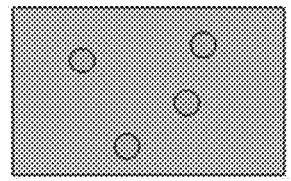
Figure 8:
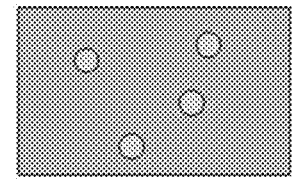
Figure 8:
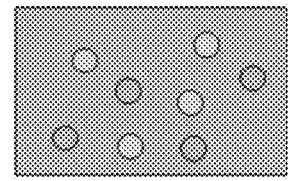

The filler of the dielectric composite may be compounded by being present in a form of particles, layers, or rods in the matrix. FIG. 8 shows application examples based on shapes and characteristics of a filler. As shown in FIG. 8, the filler may be present in the form of the particles, the layers, or the rods. In addition, depending on the characteristics of the filler, a great amount of filler of the material that increases the dielectric constant may be put to increase the dielectric constant, a great amount of filler that increases the magnetic constant may be put to increase the magnetic constant, and the fillers may be put by being mixed with each other in a multifunctional form.

The electrode member 200 is disposed in the form of being embedded in the dielectric composite. As for the electrode member, two and three pairs of electrode members are embedded in the dielectric composite respectively for single-phase and three-phase power supplies, and each pair of electrodes is connected in parallel with a power supply input. A pair of electrode members is composed of two electrodes facing each other.

The reactive power and the power efficiency degradation described above are mainly caused by phase distortion and harmonic wave generation, respectively. In order to solve such phase deformation and harmonic wave generation, in the present disclosure, the electrode member is disposed in the form of being embedded in the dielectric composite, and a detailed content thereof is as follows.

In the case of reactive power, a current sine wave is transformed to have a phase difference with respect to a voltage sine wave by the non-linear load, so that input power is not entirely used by the electronic device and a portion of the input power is discarded. The reactive power may be reduced by adjusting the phase via connection of a capacitor bank by the arrangement of the electrode members in the present disclosure. As the input power is stored and then released again by a capacitor formed by the electrode when one or more pairs of the electrode members embedded in the dielectric composite are connected in parallel with the power supply, the voltage sine wave and the current sine wave become similar to each other in phase again, thereby reducing the reactive power.

The power efficiency degradation of the active power may be resolved via harmonic wave filtering. Inductance may be generated via the connection of the electrode member embedded in the magnetic dielectric composite. This selectively removes only the harmonic wave by allowing a sine wave having a low frequency to have a low resistance and allowing a harmonic wave having a high frequency to have a high resistance.

That is, in the present disclosure, as the electrode member is embedded in the dielectric composite, and a shape and an arrangement of the two electrodes facing each other of each pair of electrode members are controlled, the capacitance or the inductance may be generated and the generation of each of the capacitance and the inductance may be controlled. That is, one or both of the harmonic wave reduction effects by the capacitor bank and the inductance may be achieved by controlling the shape and the arrangement of the electrodes of each pair of electrode members based on the input power and characteristics of the electronic device used. In addition, because there is no additional power consumed, steady power saving may be achieved with only standby power.

As for the electrode member, two and three pairs of electrode members are embedded in the dielectric composite respectively for the single-phase and three-phase power supplies, and each pair of electrodes is connected in parallel with the power supply input. The pair of electrode members is composed of the two electrodes facing each other.

Figure 4:
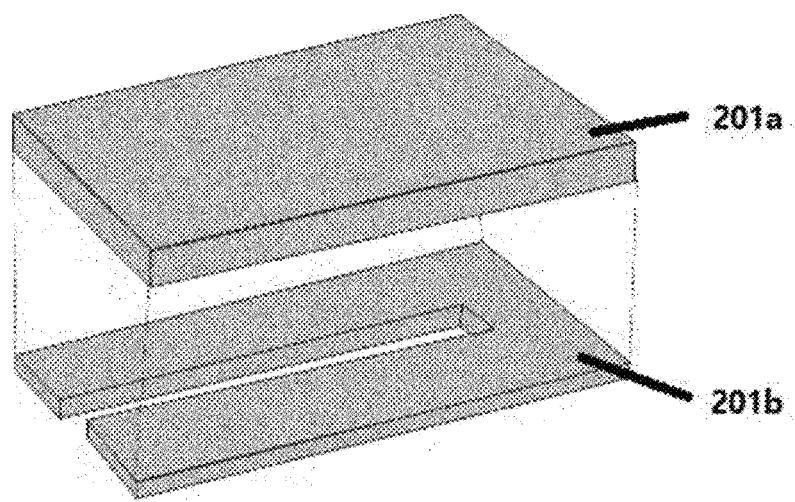
FIG. 4 shows one aspect of two electrodes constituting a pair of electrode members according to one embodiment of the present disclosure.

FIG. 4 shows one aspect of two electrodes constituting a pair of electrode members according to one embodiment of the present disclosure.

As shown in FIG. 4, one electrode 201a may be formed in a rectangular planar shape, and a remaining electrode 201b may face the electrode 201a in a "⊏" shape, a "⊐" shape, a zigzag shape in which the "⊏" shape or the "⊐" shape is repeated, or a curved "⊏" shape or "⊐" shape.

Figure 6:
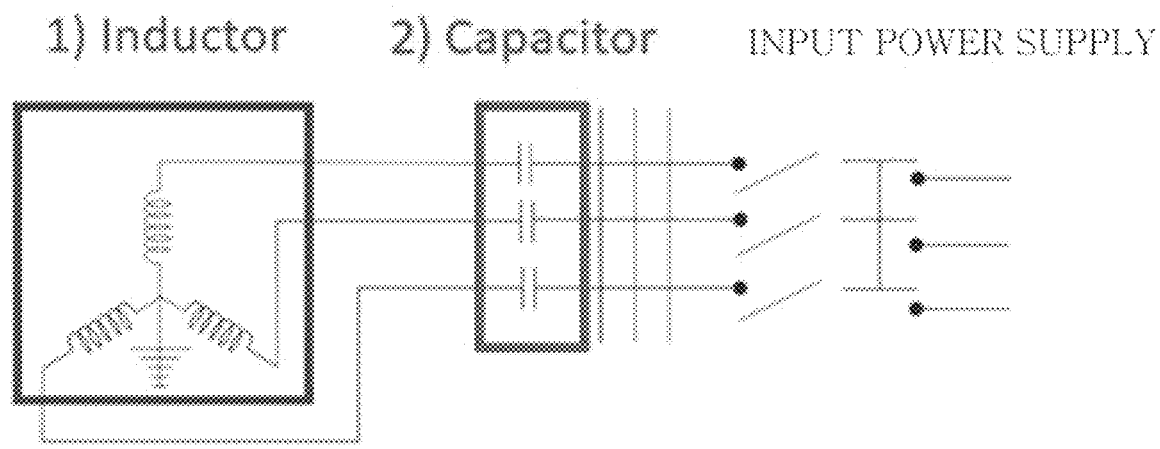
FIG. 6 shows a circuit model for occurrences of inductance and capacitance of a power reduction device according to one embodiment of the present disclosure.
Figure 7:
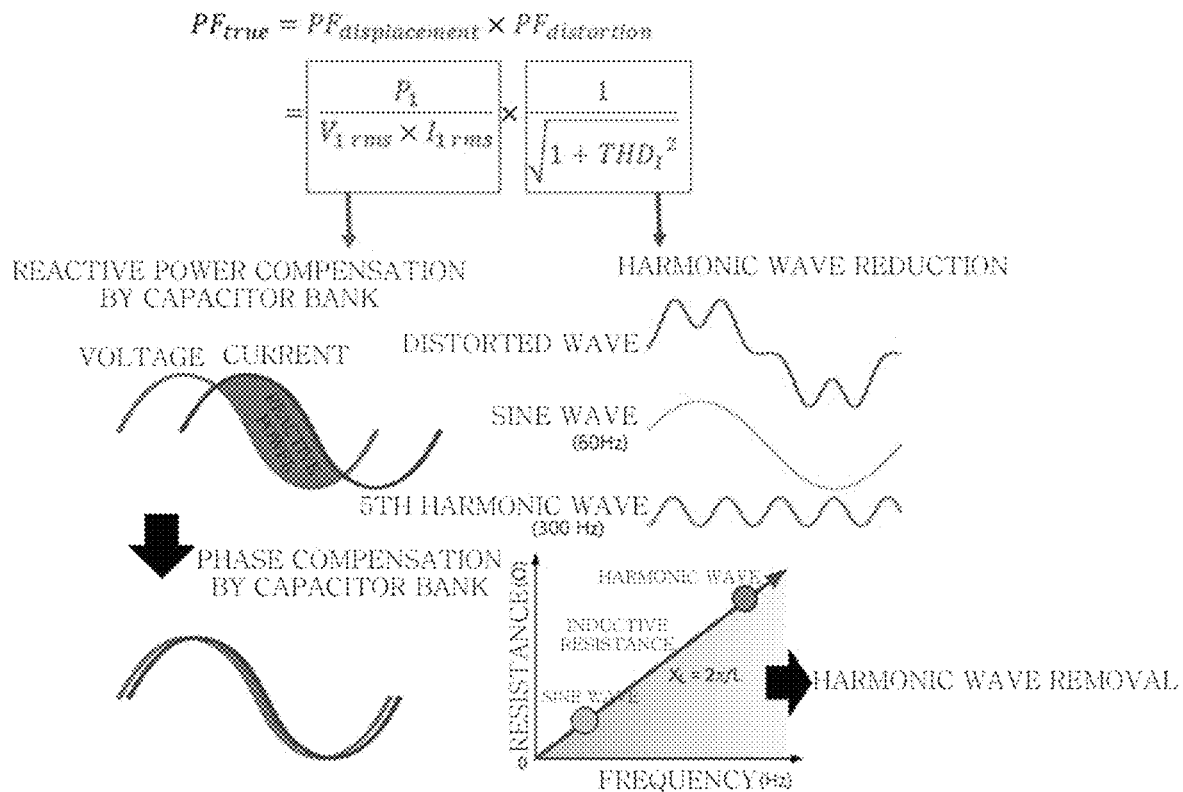
FIG. 7 shows a principle of power reduction based on occurrences of capacitance and inductance in the present disclosure.

A principle in which the capacitance is generated as the dielectric composite exists between the electrode members and the inductance is generated as the dielectric composite with the magnetic properties exists around the electrode member having a length is used. FIG. 6 shows a circuit model for occurrences of inductance and capacitance of a power reduction device according to one embodiment of the present disclosure. FIG. 7 shows a principle of power reduction based on occurrences of capacitance and inductance in the present disclosure.

The electrode member has a large area to generate great capacitance and great inductance, and it is desirable that the two electrodes make a pair. The shape of the electrode member may be changed into the curved shape, the zigzag shape, and the like depending on the use and the purpose.

The electrode members include the two or three pairs of electrode members. Depending on a usage situation of the power reduction device, it may be necessary to maximize the capacitance or it may be necessary to maximize the inductance.

In this case, when the capacitance maximization is required, the material that increases the dielectric constant may be used as the filler. In addition, each of the two or three pairs of electrode members may be composed of two electrodes facing each other, one electrode of the two electrodes of one of the two or three pairs of electrode members may have the rectangular planar shape, while the other electrode thereof may have the planar pattern of the "⊏" shape, the "ㄹ" shape, or the repetitive arrangement of the planar patterns of the "ㄷ" shape or the "ㄹ" shape. Each of the two electrodes of the remaining pair or each of remaining pairs of the two or three pairs of electrode members may have the rectangular planar shape.

Next, when the inductance maximization is required, the material that increases the magnetic constant may be used as the filler. In addition, each of the two or three pairs of electrode members may be composed of two electrodes facing each other, one electrode of the two electrodes of one of the two or three pairs of electrode members may have the rectangular planar shape, while the other electrode thereof may have the planar pattern of a "ㄷ" or "ㄹ" shape or the repetitive arrangement of planar patterns of a "ㄷ" or "ㄹ" shape. Each of the two electrodes of a remaining pair or each of remaining pairs of the two or three pairs of electrode members may have a planar pattern of a "ㄷ" or "ㄹ" shape or a repetitive arrangement of planar patterns of a "ㄷ" or "ㄹ" shape.

The electrode member may be made of all materials having conductivity, such as a conductive polymer and a conductive composite, containing metallic materials, such as copper, silver, and gold.

Although the present disclosure has been described above with reference to the preferred Examples, those skilled in the art will understand that various modifications and changes may be made to the present disclosure without departing from the spirit and scope of the present disclosure set forth in following claims.

What is claimed is:

1. A power reducing device based on a dielectric composite, the device disposed between and connected in parallel with an input power supply and an electronic device, the power reducing device comprising:
   electrode members embedded in a dielectric composite in a casing,
   wherein the electrode members include two or three pairs of electrode members,
   wherein each of the two or three pairs of electrode members is composed of two electrodes directly facing each other,
   wherein one electrode of the two electrodes of each of the two or three pairs of electrode members has a rectangular planar shape with equal opposite sides, while the other electrode thereof has a planar pattern of a "ㄷ" or "ㄹ" shape or a repetitive arrangement of planar patterns of a "ㄷ" or "ㄹ" shape, and
   wherein the dielectric composite contains a filler for increasing a dielectric constant to increase capacitance or a filler for increasing a magnetic constant to increase inductance.

2. The power reducing device of claim 1, wherein the filler for increasing the dielectric constant includes at least one of a reduced graphene oxide, a carbon nanotube, a graphene, a conductive metal, CCTO, $TiO_2$, or $Al_2O_3$.

3. The power reducing device of claim 1, wherein the filler for increasing the magnetic constant includes $Fe_2O_3$ or Ni.

4. The power reducing device of claim 1, wherein the filler is present in a form of particles, layers, or rods.

5. The power reducing device of claim 1, wherein the other electrode thereof has a planar pattern of a "ㄹ" shape.

6. The power reducing device of claim 1, wherein the other electrode thereof has a repetitive arrangement of planar patterns of a "ㄹ" shape.

7. The power reducing device of claim 1, wherein the filler for increasing the dielectric constant includes at least one of a reduced graphene oxide, a carbon nanotube, a graphene, a conductive metal, $TiO_2$, or $Al_2O_3$.

8. A power reducing device based on a dielectric composite, the device disposed between and connected in parallel with an input power supply and an electronic device, the power reducing device comprising:
   electrode members embedded in a dielectric composite in a casing,
   wherein the electrode members include two or three pairs of electrode members,
   wherein each of the two or three pairs of electrode members is composed of two electrodes facing each other,
   wherein one electrode of the two electrodes of one of the two or three pairs of electrode members has a rectangular planar shape with equal opposite sides, while the other electrode thereof has a planar pattern of a "ㄷ" or "ㄹ" shape or a repetitive arrangement of planar patterns of a "ㄷ" or "ㄹ" shape,
   wherein each of the two electrodes of a remaining pair or each of remaining pairs of the two or three pairs of electrode members has a rectangular planar shape, and
   wherein the dielectric composite contains a filler for increasing a dielectric constant to increase capacitance or a filler for increasing a magnetic constant to increase inductance.

9. The power reducing device of claim 8, wherein the filler for increasing the dielectric constant includes at least one of:
   a carbon-based conductive material including a reduced graphene oxide, a carbon nanotube, and a graphene;
   a conductive metal; or
   a ceramic material with a high dielectric constant including CCTO, $TiO_2$, and $Al_2O_3$.

10. The power reducing device of claim 8, wherein the filler for increasing the magnetic constant includes a magnetic material including $Fe_2O_3$ or Ni.

11. The power reducing device of claim 8, wherein the filler is present in a form of particles, layers, or rods.

12. A power reducing device based on a dielectric composite, the device disposed between and connected in parallel with an input power supply and an electronic device, the power reducing device comprising:
   electrode members embedded in a dielectric composite in a casing,
   wherein the electrode members include two or three pairs of electrode members,
   wherein each of the two or three pairs of electrode members is composed of two electrodes directly facing each other,
   wherein one electrode of the two electrodes of one of the two or three pairs of electrode members has a rectangular planar shape with equal opposite sides, while the other electrode thereof has a planar pattern of a "ㄷ" or "ㄹ" shape or a repetitive arrangement of planar patterns of a "ㄷ" or "ㄹ" shape,
   wherein each of the two electrodes of a remaining pair or each of remaining pairs of the two or three pairs of electrode members has a planar pattern of a "ㄷ" or "ㄹ" shape or a repetitive arrangement of planar patterns of a "ㄷ" or "ㄹ" shape, and
   wherein the dielectric composite contains a filler for increasing a dielectric constant to increase capacitance or a filler for increasing a magnetic constant to increase inductance.

13. The power reducing device of claim 12, wherein the filler for increasing the dielectric constant includes at least one of:
- a carbon-based conductive material including a reduced graphene oxide, a carbon nanotube, and a graphene;
- a conductive metal; or
- a ceramic material with a high dielectric constant including CCTO, $TiO_2$, and $Al_2O_3$.

14. The power reducing device of claim 12, wherein the filler for increasing the magnetic constant includes a magnetic material including $Fe_2O_3$ or Ni.

15. The power reducing device of claim 12, wherein the filler is present in a form of particles, layers, or rods.

* * * * *